United States Patent
Sanders et al.

(12)

(10) Patent No.: US 11,128,697 B2
(45) Date of Patent: *Sep. 21, 2021

(54) UPDATE PACKAGE DISTRIBUTION USING LOAD BALANCED CONTENT DELIVERY SERVERS

(71) Applicant: Red Hat, Inc., Raleigh, NC (US)

(72) Inventors: Todd Brian Sanders, Clayton, NC (US); Jason Edward Dobies, Mickleton, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,253

(22) Filed: Apr. 27, 2020

(65) Prior Publication Data
US 2020/0259894 A1     Aug. 13, 2020

Related U.S. Application Data

(63) Continuation of application No. 13/405,467, filed on Feb. 27, 2012, now Pat. No. 10,637,918.

(51) Int. Cl.
*G06F 15/173* (2006.01)
*H04L 29/08* (2006.01)
*G06F 9/50* (2006.01)

(52) U.S. Cl.
CPC ........ *H04L 67/1023* (2013.01); *G06F 9/5027* (2013.01); *H04L 67/1002* (2013.01);
(Continued)

(58) Field of Classification Search
CPC ............ H04L 67/1023; H04L 67/1002; H04L 67/1031; H04L 67/1095; H04L 67/1017; G06F 9/5027

(Continued)

(56) References Cited

U.S. PATENT DOCUMENTS 6,378,960 B1    4/2002  Demmeler
6,606,643 B1    8/2003  Emens et al.
(Continued)

FOREIGN PATENT DOCUMENTS

EP    1324546 A1    7/2003

OTHER PUBLICATIONS

Jason Dobies, "Red Hat Update Infrastructure 1.1 Deployment Guide", 2010, Edition 1, 32 pages (Year: 2010).*
(Continued)

*Primary Examiner* — Tonia L Dollinger
*Assistant Examiner* — Schquita D Goodwin
(74) *Attorney, Agent, or Firm* — Lowenstein Sandler LLP

(57) ABSTRACT

A client system maintains a source list comprising an ordered sequence of a plurality of content delivery servers. The ordered sequence indicates a sequence of the plurality of content delivery servers for the client system to send a request to obtain a mirror list. Each of the plurality of content delivery servers maintains a cluster membership list identifying the content delivery servers in a cluster, wherein the source list is configured in view of a cluster membership list. The client system determines that a first content delivery server in the ordered sequence of the source list is unavailable. A mirror list request is sent to a next content delivery server listed on the source list. The client system receives, from the next content delivery server in the source list, an updated mirror list including an updated load balanced ordered sequence of the plurality of content delivery servers in view of an availability associated with remaining content delivery servers of the plurality of content delivery servers for the client system to contact to obtain an update package comprising information relating to a computing resource associated with the client system.

14 Claims, 8 Drawing Sheets

(52) U.S. Cl.
CPC ...... *H04L 67/1031* (2013.01); *H04L 67/1095* (2013.01); *H04L 67/1017* (2013.01)

(58) Field of Classification Search
USPC ........................................................ 709/223
See application file for complete search history.

(56) References Cited

U.S. PATENT DOCUMENTS

| | | | |
|---|---|---|---|
| 6,718,361 B1 | 4/2004 | Basani et al. | |
| 7,734,683 B1 | 6/2010 | Bergenwall et al. | |
| 7,757,236 B1 | 7/2010 | Singh | |
| 7,840,674 B1* | 11/2010 | Sterling | H04L 67/1008 709/226 |
| 7,912,954 B1 | 3/2011 | Oesterreicher et al. | |
| 7,987,449 B1 | 7/2011 | Marolia et al. | |
| 8,549,114 B2* | 10/2013 | Reddy | H04L 41/082 709/221 |
| 2002/0169890 A1 | 11/2002 | Beaumont et al. | |
| 2003/0009538 A1 | 1/2003 | Shah et al. | |
| 2004/0010538 A1 | 1/2004 | Miller et al. | |
| 2004/0230965 A1 | 11/2004 | Okkonen | |
| 2004/0254984 A1 | 12/2004 | Dinker | |
| 2006/0089965 A1 | 4/2006 | Fontes et al. | |
| 2007/0064743 A1 | 3/2007 | Bettis et al. | |
| 2007/0106771 A1 | 5/2007 | Lucash et al. | |
| 2007/0118668 A1 | 5/2007 | McCarthy et al. | |
| 2007/0124380 A1 | 5/2007 | Carr et al. | |
| 2007/0150602 A1* | 6/2007 | Yared | H04L 67/142 709/227 |
| 2007/0180059 A1 | 8/2007 | Marl et al. | |
| 2007/0245010 A1 | 10/2007 | Arn et al. | |
| 2008/0016206 A1* | 1/2008 | Ma | H04L 43/12 709/224 |
| 2008/0281950 A1 | 11/2008 | Wald et al. | |
| 2008/0281958 A1 | 11/2008 | McKinnon et al. | |
| 2009/0037367 A1 | 2/2009 | Wein | |
| 2009/0119306 A1* | 5/2009 | Garbow | H04L 67/1095 |
| 2009/0248696 A1 | 10/2009 | Rowles et al. | |
| 2009/0276842 A1 | 11/2009 | Yevmenkin et al. | |
| 2010/0095184 A1 | 4/2010 | Zuckerman et al. | |
| 2010/0162374 A1 | 6/2010 | Nair | |
| 2010/0223608 A1 | 9/2010 | DeHaan et al. | |
| 2011/0060798 A1 | 3/2011 | Cho et al. | |
| 2011/0107135 A1 | 5/2011 | Andrews et al. | |
| 2011/0138052 A1 | 6/2011 | Caplan et al. | |
| 2011/0145314 A1* | 6/2011 | Knize | H04L 67/2814 709/203 |
| 2011/0252270 A1 | 10/2011 | Abraham et al. | |
| 2011/0265074 A1 | 10/2011 | Vidal et al. | |
| 2011/0276695 A1 | 11/2011 | Maldaner | |
| 2011/0296390 A1* | 12/2011 | Vidal | G06F 11/3051 717/168 |
| 2011/0302571 A1 | 12/2011 | O'Farrell et al. | |
| 2012/0047284 A1 | 2/2012 | Tarkoma | |
| 2012/0066371 A1* | 3/2012 | Patel | H04L 67/1031 709/224 |
| 2012/0072581 A1 | 3/2012 | Tung et al. | |
| 2012/0072604 A1 | 3/2012 | Stephan et al. | |
| 2012/0131639 A1 | 5/2012 | Alex et al. | |
| 2012/0317235 A1 | 12/2012 | Nguyen et al. | |
| 2013/0007505 A1 | 1/2013 | Spear | |
| 2013/0041972 A1 | 2/2013 | Field et al. | |
| 2013/0219020 A1* | 8/2013 | McCarthy | H04L 67/1019 709/218 |
| 2014/0241315 A1 | 8/2014 | Niu et al. | |

OTHER PUBLICATIONS

Dobies et al., "Red Hat Update Infrastructure 1.1 Deployment Guide", 2010, Edition 1 (Year: 2010), 32 pages.

Pathan et al., "A Taxonomy and Survey of Content Delivery Networks" 2010, 44 pages.

* cited by examiner

FIGURE 4A
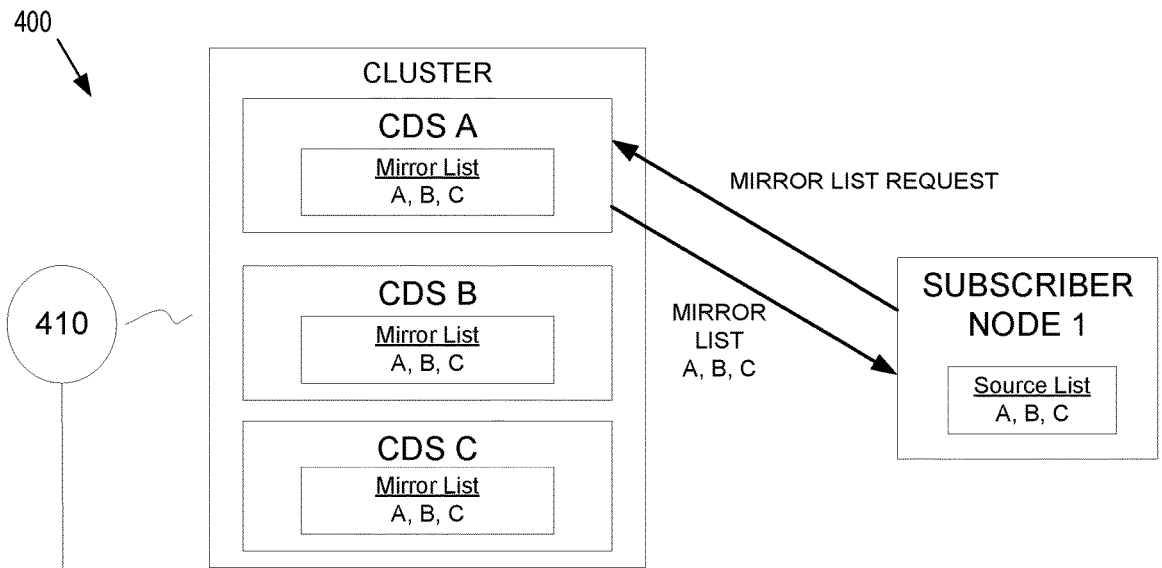
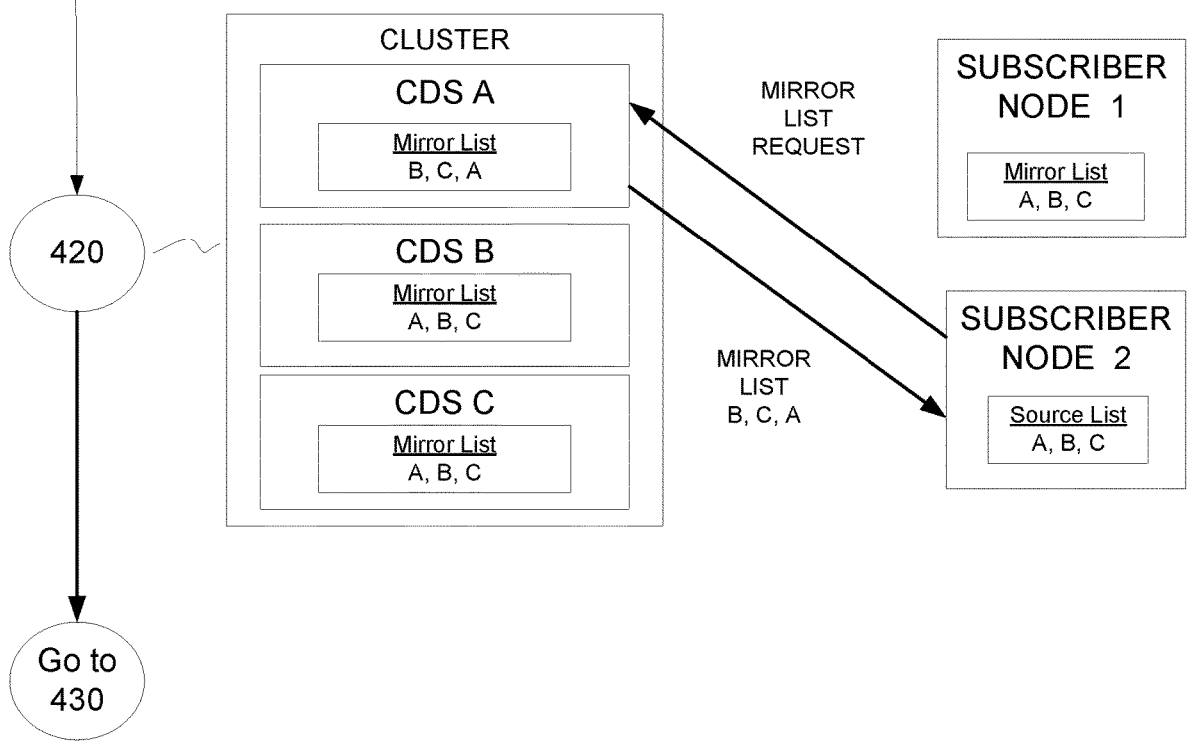

FIGURE 5
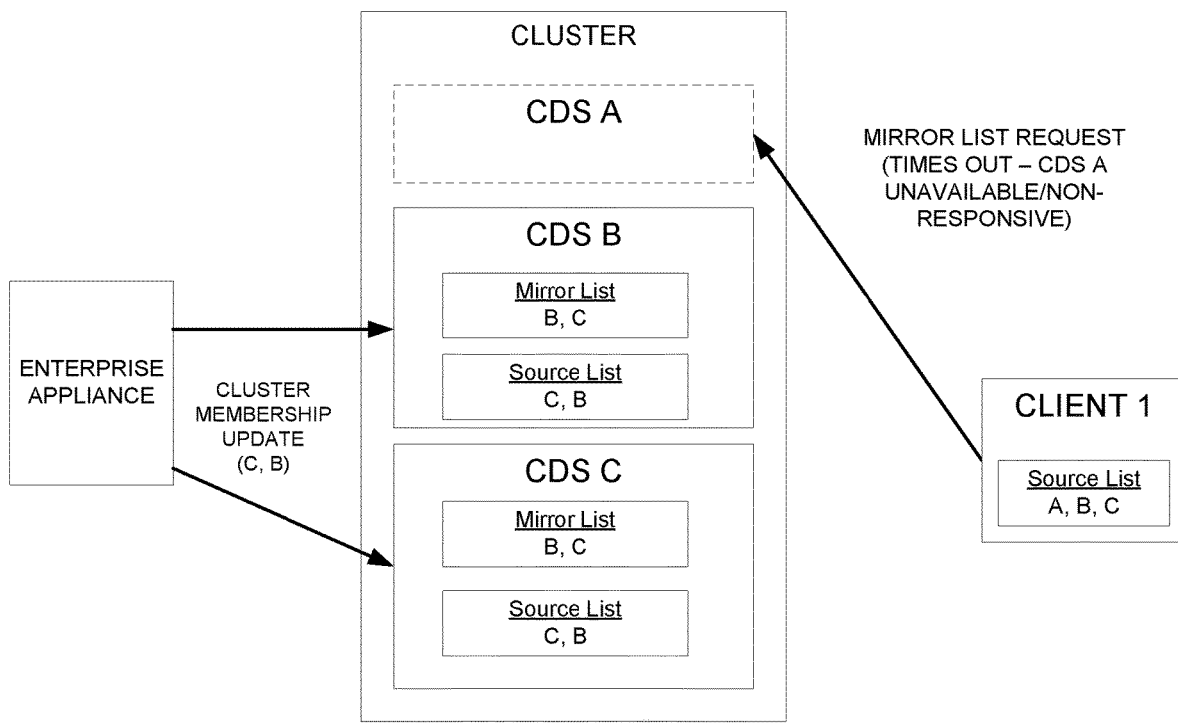
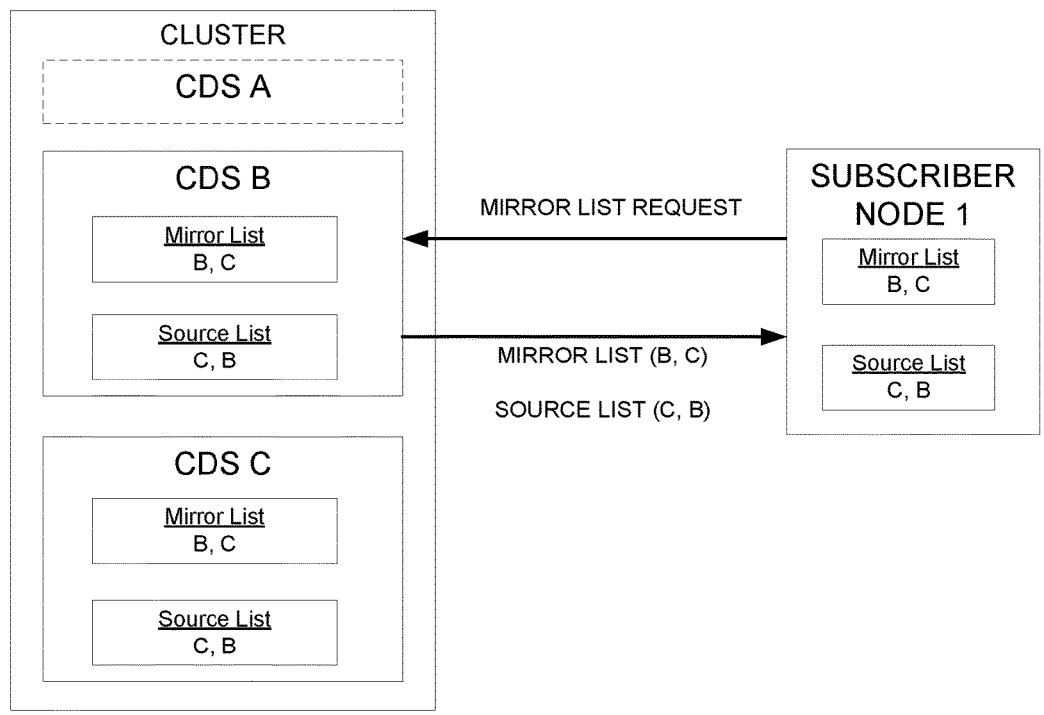

… (1)

UPDATE PACKAGE DISTRIBUTION USING LOAD BALANCED CONTENT DELIVERY SERVERS

CROSS-REFERENCE TO RELATED APPLICATION

This application is a continuation of U.S. patent application Ser. No. 13/405,467 filed on Feb. 27, 2012, titled "Method and System for Load Balancing Content Delivery Server", the entirety of which is hereby incorporated by reference herein.

TECHNICAL FIELD

Embodiments of the present invention relate to computing systems, and more specifically, to managing the delivery of update packages to multiple subscriber nodes in a cloud environment via load-balanced content delivery servers.

BACKGROUND

Cloud-based computing systems are configured to provide computing resources (e.g., Red Hat Enterprise Linux instances) to multiple subscriber nodes, such as certified cloud providers. The efficient management of a cloud-based computing system usually includes the provisioning of certain update packages to the subscriber nodes relating to the operation of the cloud computing resources. The update package(s), also referred to as an update or an update stream, may be delivered to and consumed by the subscriber nodes that are operating in the cloud environment. For example, the update package may include information relating to enhancements, features, functionality, vulnerabilities, patches, and fixes relating to the computing resources.

An update package management system is typically employed to manage the packages and may include a horizontally-scalable distribution tier for delivery of the update packages, referred to as the content delivery servers (CDS). The delivery of update packages by the multiple CDSs to the subscriber nodes is typically managed and coordinated by an enterprise appliance, such as, for example, the Red Hat Update Appliance (RHUA).

From the subscriber node perspective, it is desirable that the CDSs be both highly available and appropriately load-balanced to ensure the reliable and efficient downloading of the desired update package(s). In a conventional arrangement, the subscriber node may initiate a request (e.g., a yum command) to a CDS server to obtain a mirror list file. The mirror list includes a prioritized listing of multiple CDSs assigned to a cluster which provides an ordered list of CDSs to contact to obtain the update packages. However, if the CDS server that is sent the request for the mirror list is unavailable, the request fails, the mirror list can not be sent to the subscriber node, and the subscriber node can not engage in the update package acquisition process. Therefore, this arrangement has a single point of failure—the CDS server contacted by the subscriber node to obtain the mirror list.

In other conventional arrangements, requests from the subscriber nodes may be first directed to a single load balancer server configured to maintain the mirror list, which may in turn use HTTP-based communications to forward the request to one or more CDSs in accordance with the mirror list. However, like the system described above, if the initial load balancer server is unavailable, the subscriber node can not connect with a CDS to obtain the one or more update packages. Accordingly, the system includes a single point of failure and does not provide a high availability update stream.

Due to the elastic and scalable nature of the CDS tier wherein CDS instances may be added or removed (or otherwise become unavailable due to, for example, a hardware failure), there is a need to actively manage the CDS tier to ensure a proper load balancing amongst the CDSs and maintain high-available communication between the CDSs and the subscriber nodes. Particularly in the instance when a CDS is no longer available (i.e., the CDS is removed or fails), there is a need for fail-over protection and un-interrupted delivery of the one or more update packages to the subscriber nodes. However, conventional CDS tiers lack the ability to effectively account for an unavailable CDS while efficiently load balancing the available CDSs.

BRIEF DESCRIPTION OF THE DRAWINGS

FIGS. 4A and 4B illustrate a schematic and process flow diagram for a load balancing update management system, according to an embodiment of the present invention.

FIG. 5 illustrates a schematic diagram relating to a removal of a content delivery server from a cluster, according to an embodiment of the present invention.

DETAILED DESCRIPTION

Figure 1:
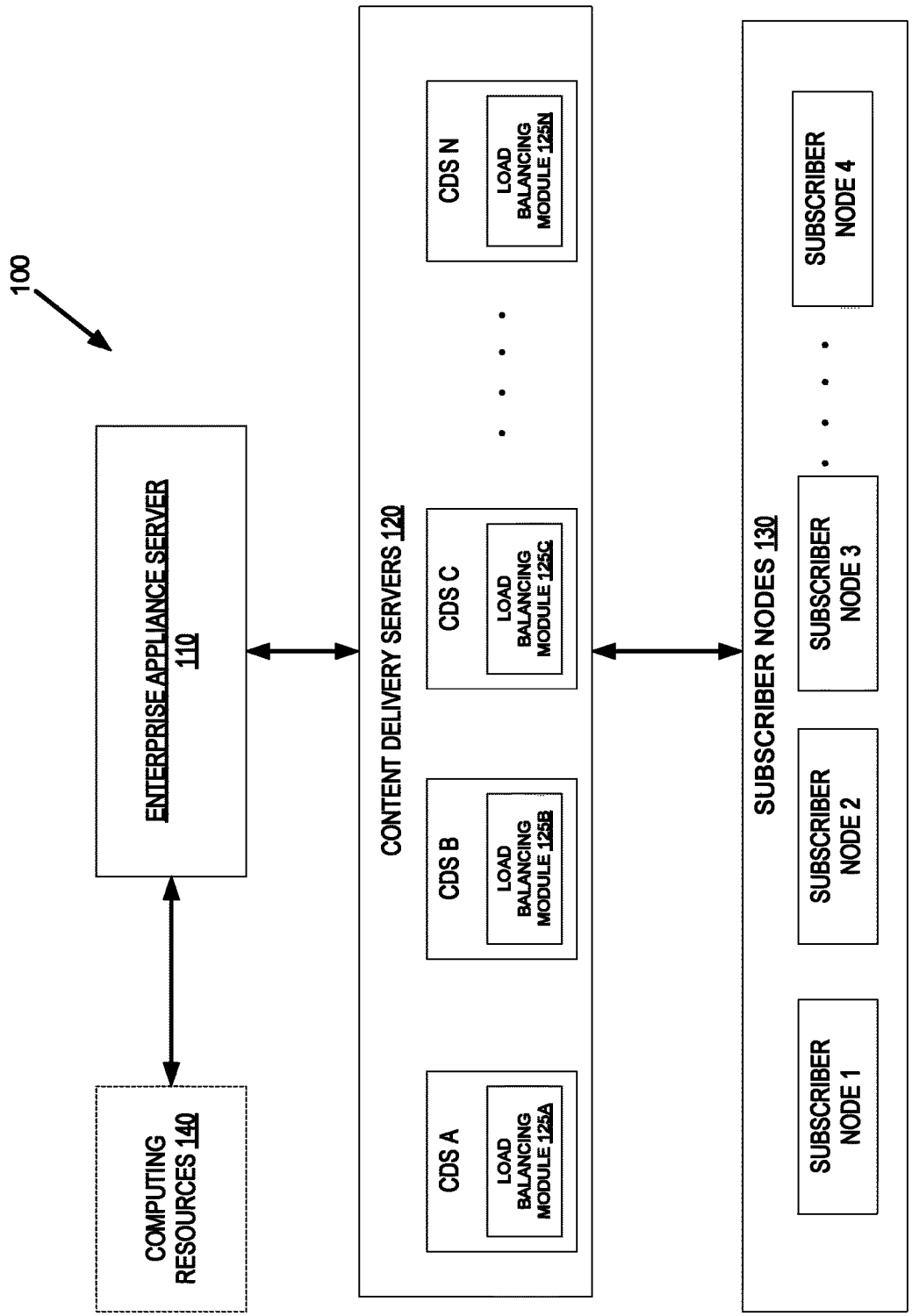
FIG. 1 is a block diagram of an exemplary cloud computing system according to embodiments of the invention.

Methods and systems for a high availability and load balanced update management system. A cloud computing update management system is provided including an enterprise appliance configured to manage multiple content delivery servers (CDSs) configured to deliver update packages to multiple subscriber nodes.

The subscriber nodes are configured to maintain a source list identifying multiple CDSs that are configured to receive a request for a mirror list (i.e., the mirror list request). The source list includes a first entry representing a primary CDS, or the CDS that is initially sent the mirror list request by the subscriber node. Advantageously, providing each subscriber node with the source list avoids having any single point of failure, since the subscriber node is able to send a mirror list request to a next CDS on the list in the event that a previous request fails due to the unavailability of a CDS.

Each CDS maintains the mirror list which includes a listing of the CDSs that the subscriber node contacts to request the desired update packages (e.g., an update stream). The mirror list is ordered such that the initial entry on the list (e.g., CDS A) is contacted first by the subscriber node, the second entry (e.g., CDS B) is contacted second in the event the first CDS (e.g., CDS A) is unavailable, and so on until the end of the mirror list.

Furthermore, each CDS is configured to update the mirror list to modify the order of the CDSs in the listing. Accordingly, a first subscriber node may receive a mirror list identifying a first order of CDSs to send an update request (e.g., CDS A, CDS B, CDS C). Subsequently, based on an update to the mirror list by a CDS, a second subscriber node may receive an updated mirror list identifying an updated order of CDSs to send an update request (e.g., CDS B, CDS C, CDS A). Advantageously, each CDS may apply a suitable load balancing algorithm (e.g., a round-robin algorithm) to the mirror list to update the mirror list prior to sending the list to the subscriber node in response to a mirror list request. The updating of the mirror list by each of the CDSs provides load balancing of the multiple CDSs and the efficient delivery of content, such as an update stream, to the multiple subscriber nodes.

In an embodiment, the subscriber node includes a plug-in (e.g., a yum plug-in) configured to maintain the source list and send requests (e.g., yum requests) to one or more CDSs for the mirror list and for the one or more update packages (e.g., an update stream). Pre-configuring the subscriber node with the source list avoids the single point of failure problem in that the subscriber node has a list of CDSs that it can send requests to in order to obtain the mirror list. If the first entry on the list (i.e., the primary CDS) is unavailable, the subscriber node may then attempt to contact the next entry on the list, and so on until a connection to a CDS on the source list is made and the mirror list is provided to the client.

FIG. 1 is a block diagram of an exemplary cloud computing update management system 100 according to embodiments of the invention. The content delivery system 100 includes an enterprise appliance server 110 configured to manage multiple content delivery servers 120 (e.g., CDS A, CDS B, CDS C, . . . CDS N). Each CDS 120 includes a software component (i.e., a set of instructions executable by a processing device of the CDS 120), referred to as the load balancing module (e.g., load balancing module 125A, load balancing module 125B, load balancing module 125C . . . load balancing module 125N), configured to perform the actions described in detail below.

In an embodiment, the enterprise appliance server 110 organizes the multiple CDSs 120 into one or more clusters. Any number of clusters may be formed and the clustering of the CDSs 120 may be conducted according to various techniques, including, for example, a geography-based clustering wherein CDSs physically located in a particular geographic area are clustered together.

Upon establishing the one or more clusters, the enterprise appliance server 110 generates a cluster membership list and provides the cluster membership list to each CDS 120 in the cluster. The cluster membership list identifies each CDS in the cluster and may be updated by the enterprise appliance server 110 to add and/or delete one or more CDSs from the cluster. In the event of an update to the cluster membership list, the enterprise appliance server 110 sends a cluster membership update to each of the CDSs in the cluster, as described in further detail with reference to FIG. 5.

In an embodiment, the load balancing module (e.g., load balancing module 125A-N) of each CDS is configured to maintain a mirror list including a listing of the CDSs in the cluster that the multiple subscriber nodes 130 may contact to request desired content. The subscriber nodes 130 may be any physical or virtual machines configured to communicate with the CDSs 120 to request and obtain content.

In an embodiment, the content includes an update stream including one or more packages, such as, for example, packages including information relating to enhancements, features, functionality, vulnerabilities, patches, and fixes relating to one or more computing resources 140 (e.g., the Red Hat Network, custom third party content). In an embodiment, the CDSs are configured to serve the packages (e.g., .rpm files) via an HTTPS-based communication to the subscriber nodes 130 in a cloud computing environment. In an embodiment, the subscriber nodes 130 are nodes running operating systems (host or guest operating systems such as Microsoft or Linux) instances) in the cloud computing environment, which connect to the CDSs for package updates. The subscriber nodes 130 may include a package manager (e.g., Windows Server Update Services (WSUS) or yum) configured to communicate with the CDSs as part of the package update process.

The subscriber nodes 130 are configured to maintain a source list representing an ordered list having an initial (or first) entry, referred to as the primary CDS. The primary CDS on the source list is the CDS that each subscriber node 130 contacts initially in order to obtain the mirror list. In an embodiment, the primary CDS may be designated by users of the subscriber nodes 130, also referred to as customers or certified cloud providers. In an embodiment, the subscriber nodes 130 may include a plug-in (e.g., a yum plug-in) configured to maintain the source list. Advantageously, maintenance of the source list by the subscriber nodes 130 provides the subscriber nodes 130 with a highly available system including multiple CDS options to contact in order to obtain the mirror list. In an embodiment, the subscriber nodes 130 are configured to dynamically learn the changes to the list (as embodied in the mirror list provided by the CDS 120).

In an embodiment, when a subscriber node 130 wishes to retrieve the mirror list, the subscriber node 130 sends a mirror list request to the primary CDS on the source list. In response, the primary CDS 120 provides the mirror list to the subscriber node 130. The subscriber node 130 may then use the mirror list to determine which CDS 120 to send a content request. In an embodiment, the subscriber node 130 sends the content request to the first CDS listed on the mirror list. In the event that the content request fails, the subscriber node 130 may then move to the next entry on the mirror list and send a content request to that CDS 120.

In an embodiment, the load balancing module (e.g., load balancing module 125A-N) of each CDS 120 is configured to update the mirror list in accordance with a load balancing algorithm. The load balancing module (e.g., load balancing module 125A-N) is associated with a memory of the CDS configured to store the mirror list and the source list. In an embodiment, a round robin load balancing algorithm is employed, however, one having ordinary skill will appreciate that any suitable load balancing algorithm may be utilized.

In an embodiment, an initial source list maintained by the subscriber node 130 may be updated and/or replaced by the CDS via the delivery of an updated source list. In particular, the updating of the source list occurs when one or more CDSs 120 have been added or removed from a cluster. For example, if a CDS 120 is added to a cluster, a mirror list (including any updates relative to the source list) is delivered to the subscriber node. It is noted that in certain instances, the mirror list delivered by the CDS 120 to the subscriber node 130 may be identical to the source list maintained by the subscriber node 130.

In an embodiment, the CDSs 120 serve as both mirror list servers (i.e., the maintainers and managers of the mirror list) and the entries on the mirror list itself (i.e., an entry/option on the mirror list that the subscriber node 130 may connect to in order to obtain the desired content).

The updating or changing of the list via the delivery of the mirror list to the subscriber node 130 results in a load balancing of the system, since the order of CDS entries on the mirror list can be changed depending on the current state of the load.

In an embodiment, the subscriber nodes 130 (e.g., the plug-in) are configured to fetch the mirror list at a particular frequency (i.e., send a request for the mirror list every 24 hours) and store the mirror list in a cache for use in the content retrieval process. The request frequency and/or cache life may be set to any suitable value by an end user of the subscriber node.

Figure 2:
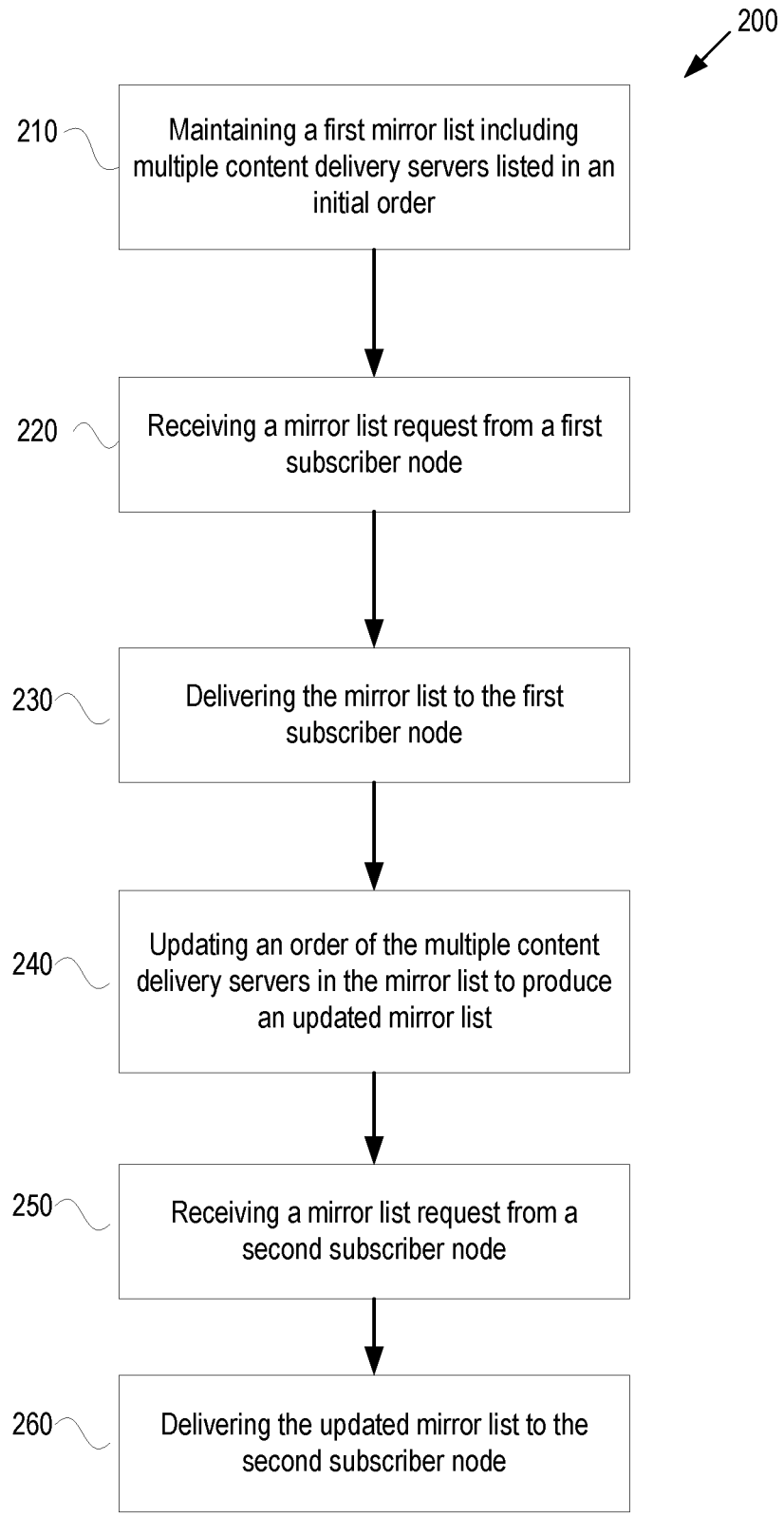
FIG. 2 is a flow diagram of a server-side method for managing delivery of the one or more update packages to a subscriber node, according to an embodiment of the present invention.

FIG. 2 is a flow diagram of one embodiment of a method 200 for load balancing a content delivery system. The method is performed by processing logic that may comprise hardware (circuitry, dedicated logic, etc.), software (such as is run on a general purpose computer system or a dedicated machine), or a combination of both. In one embodiment, the method is performed by a CDS (e.g., the CDSs 120 of FIG. 1).

Referring to FIG. 2, in block 210, each of the multiple CDSs maintains a first mirror list including multiple CDS listed in an initial order. In an embodiment, the multiple CDS listed in the mirror list are a part of the same cluster. A first subscriber node (e.g., subscriber node 1 of the subscriber nodes 130 in FIG. 1) including a source list sends a request for a mirror list (i.e., a mirror list request) to a primary CDS identified by the source list. In an embodiment, the primary CDS is the first or initial entry on the source list and/or a particular CDS designated by a user or customer managing the subscriber nodes.

In block 220, the primary CDS receives the mirror list request from the first subscriber node. The primary CDS identifies the mirror list and delivers it to the first subscriber node, in block 230. For example, the mirror list delivered to the first subscriber node may have CDS A as the initial entry, and accordingly, first subscriber node initially sends its content requests to CDS A.

In block 240, the load balancing module of the primary CDS updates an order of the multiple CDSs in the mirror list to produce an updated mirror list. In an embodiment, the update is triggered upon the receipt of a mirror list request or an update request. It is to be appreciated that each of the multiple CDSs may update the mirror list that the CDS is maintaining. In one example, the primary CDS updates an initial mirror list and changes the order of the CDS listing in accordance with a load balancing algorithm (e.g., a round robin algorithm). Continuing the example, the updated mirror list includes CDS B as the initial entry.

In an embodiment, a second subscriber node (e.g., subscriber node 2 in FIG. 1) maintaining a source list identifying the primary CDS sends a mirror list request to the primary CDS, in block 250. In response to this mirror list request, the primary CDS delivers the updated mirror list to the second subscriber node, wherein the updated mirror list includes a different initial entry than the mirror list provided to the first subscriber node (e.g., CDS B is the initial entry on the updated mirror list), in block 260. Accordingly, continuing the example above, content requests generated by the second subscriber node are sent to CDS B, since it is the initial entry on the updated mirror list. As a result of the update to the mirror list, the CDSs are able to load balance, since the one or more content requests from the first subscriber node are sent to CDS A, while the one or more content request from the second subscriber node are sent to CDS B.

Figure 3:
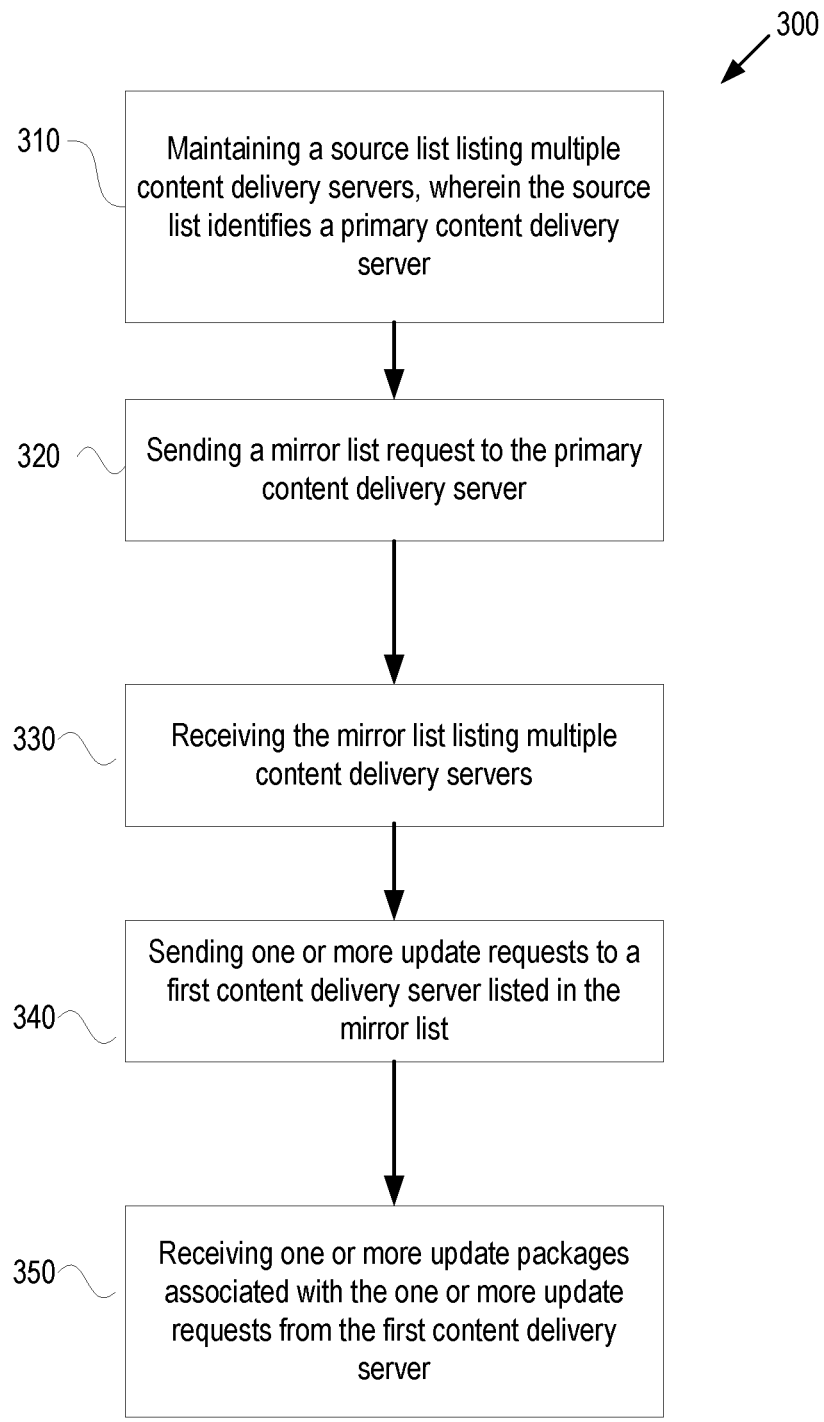
FIG. 3 is a flow diagram of a client-side method for receiving one or more update packages in a cloud computing update management system, according to an embodiment of the present invention.

FIG. 3 is a flow diagram of a method 300 for the subscriber node-side management of the content delivery. The method is performed by processing logic that may comprise hardware (circuitry, dedicated logic, etc.), software (such as is run on a general purpose computer system or a dedicated machine), or a combination of both. In one embodiment, the method is performed by a plug-in executed on a subscriber node (e.g., a yum plug-in on each of the subscriber nodes 130 of FIG. 1).

With reference to FIG. 3, a subscriber node maintains a source list listing multiple content delivery servers (e.g., CDS A, CDS B, CDS C, . . . CDS N shown in FIG. 1), in block 310. The source list further identifies a primary CDS (e.g., CDS A). Based on the source list, the subscriber node sends a mirror list request to the primary CDS, in block 320, and receives the mirror list, in block 330.

In block 340, the subscriber node sends one or more content requests to a first CDS listed in the mirror list, and in block 350, receives content (e.g., update packages) associated with the one or more content requests from the CDS. In an embodiment, at a time of a subsequent update, the subscriber node repeats the method 300 by using the initial source list and sending a mirror list request to the primary CDS. In another embodiment, the source list maintained by the subscriber node may be updated, as described in detail with reference to FIGS. 5 and 6.

Figure 4B:
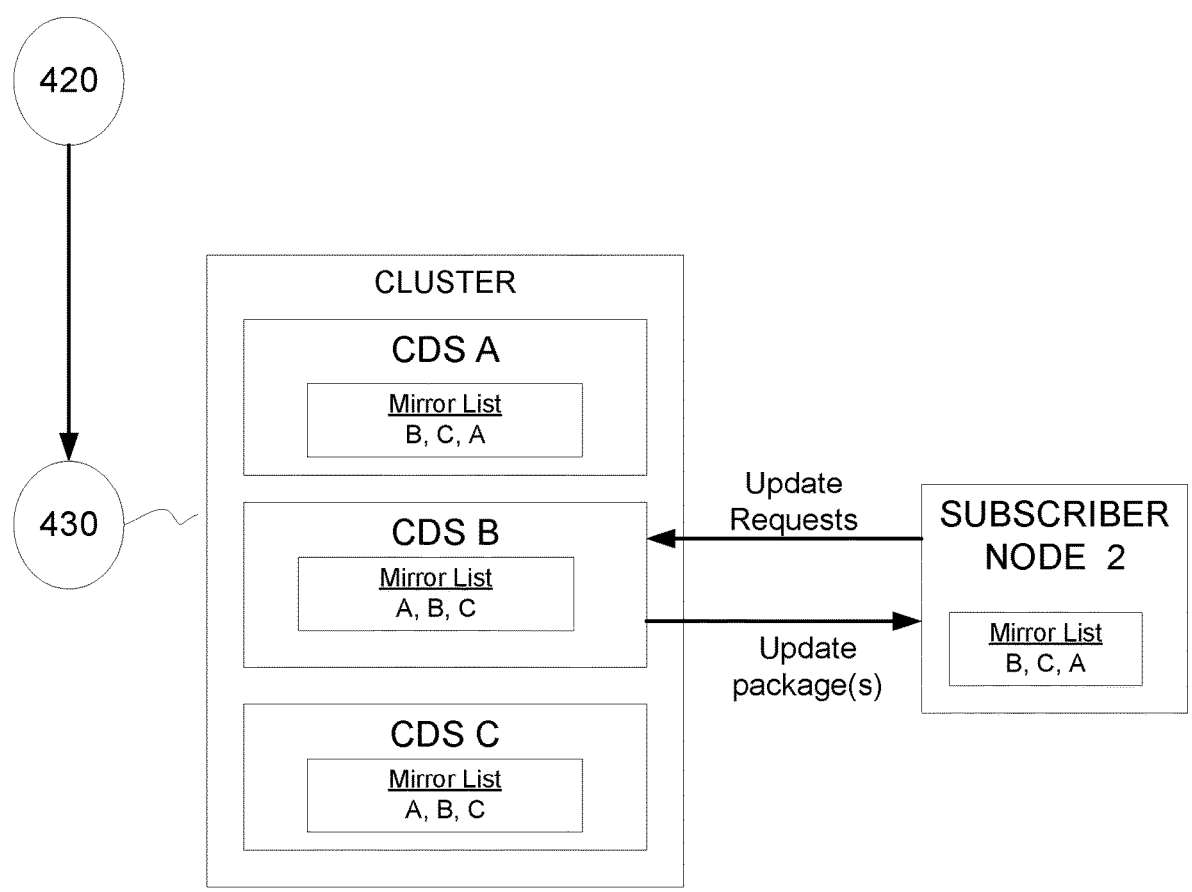

FIGS. 4A and 4B illustrate a process flow and schematic diagram relating to an exemplary method 400 for delivering content in a cloud computing environment. As shown in block 410 in FIG. 4A, three CDSs (CDS A, CDS B, and CDS C) are grouped into a cluster. Each CDS in the cluster maintains a mirror list with the following listing: A, B, C.

A subscriber node, Client 1, maintains a source list with the following listing: A, B, C. Due to its position as the initial entry on the source list, CDS A is identified as the primary CDS. Accordingly, Client 1 sends a mirror list request to CDS A. In response, CDS A delivers the mirror list (A, B, C) to Client 1. Therefore, content requests sent by Client 1 would be sent to CDS A, since CDS A is the initial or first entry on the mirror list provided to Client 1.

In block 420, CDS A updates the mirror list by applying a load balancing algorithm. In this example, a round robin algorithm is applied by CDS A and the mirror list is updated. As shown, the updated mirror list is B, C, A. A second subscriber node (Client 2) then sends a mirror list request to the primary CDS (CDS A) in accordance with its source list (A, B, C). In response, CDS A delivers the updated mirror list (B, C, A) to Client 2.

As shown in block 430 of FIG. 4B, Client 2 sends one more content requests to CDS B, since CDS B is the first or initial entry on the mirror list provided in block 420. Accordingly, load balancing is achieved since Client 1's content requests are handled by CDS A, and due to the updating of the mirror list, Client 2's content requests are handled by CDS B.

FIG. 5 provides a schematic diagram of an exemplary content delivery system wherein a CDS is unavailable (i.e., the CDS has been removed or has experienced a failure). In the example shown, the initial cluster includes CDS A, CDS B, and CDS C and Client 1 maintains a source list of A, B, C. In accordance with the source list, Client 1 sends a mirror list request to CDS A, the identified primary CDS. However, CDS A is unavailable (as denoted by the dashed lines in FIG. 5) and the mirror list request times out.

As shown in FIG. 5, the enterprise appliance determines that CDS A is no longer available (either due to its removal or failure) and provides a cluster membership update to the available portion of the cluster (CDS B and CDS C). The cluster membership update is processed by the load balancing module of the available CDSs and an updated mirror list (B, C) and an updated source list (C, B) is generated and maintained by the available CDSs. One having ordinary skill in the art will appreciate that the enterprise appliance may determine that CDS A is no longer available in view of either the active removal of CDS A from the cluster by the enterprise appliance (i.e., a removed CDS scenario), or following a failed attempt by Client 1 to contact CDS A (i.e., a downed CDS scenario)

In the downed CDS scenario, using its initial source list, Client 1 sends a mirror list request to the next entry in the source list (i.e., CDS B). In response, CDS B delivers the updated mirror list to Client 1 for use for the remainder of the update transaction. In addition, CDS B delivers the updated source list to Client 1. Client 1 may then use the mirror list for obtaining content, and send a content request to CDS B. Client 1 also updates the initial source list with the updated source list, such that, during a later update transaction, Client 1 sends its mirror list request to the new primary CDS (CDS B).

Figure 6:
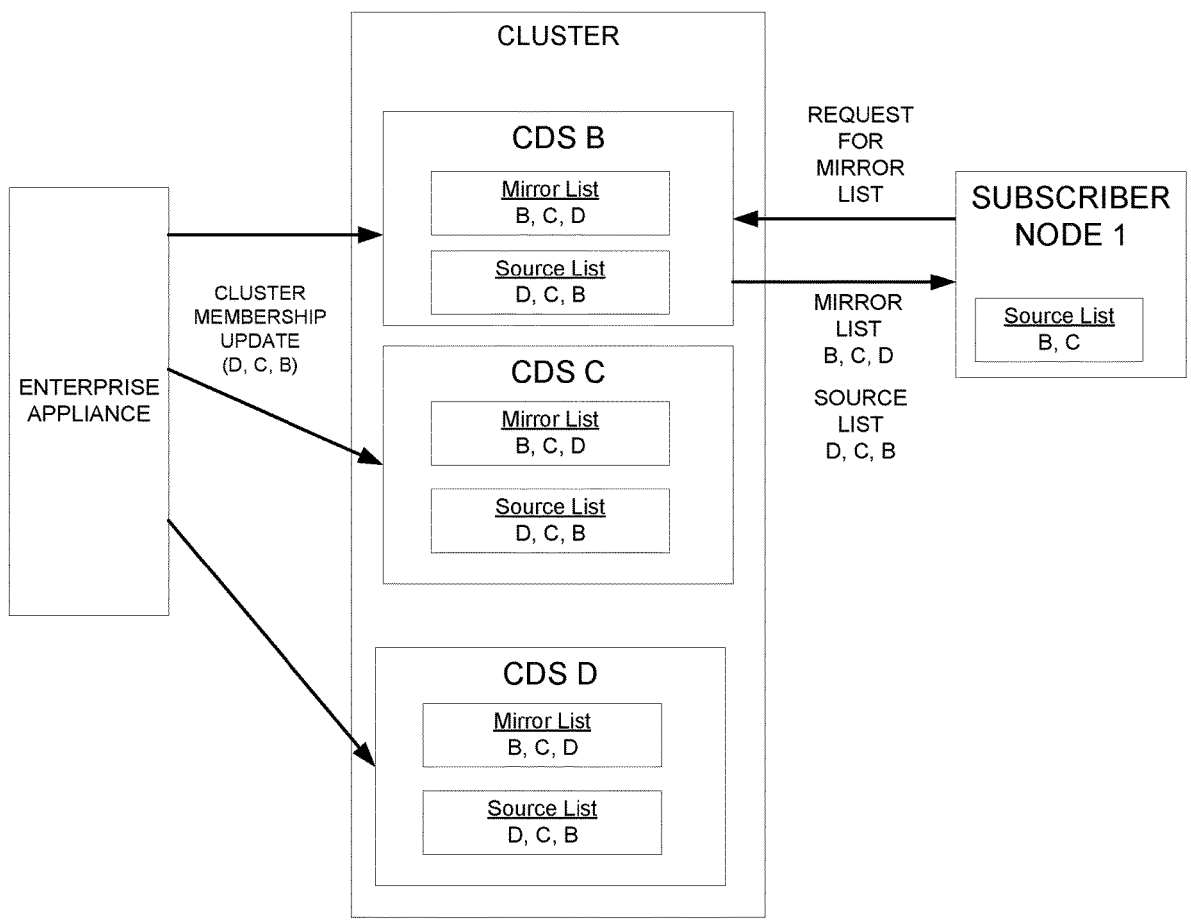
FIG. 6 illustrates a schematic diagram relating to an addition of a content delivery server to a cluster, according to an embodiment of the present invention.

FIG. 6 provides a schematic diagram of an exemplary content delivery system wherein a CDS is added to a cluster. In the example shown, Subscriber Node 1 maintains a source list of B, C reflecting the initial cluster membership including CDS B and CDS C. In the example, CDS D is added to the initial cluster which included CDS B and CDS C. As shown, the enterprise appliance sends a cluster membership update (D, C, B) to each of the CDSs in the cluster (CDS B, CDS C, and CDS D). In response, each of the CDSs in the cluster updates the mirror list to B, C, D and updates the source list to D, C, B.

As the primary CDS, CDS B receives a mirror list request from Client 1 in accordance with Client 1's source list of B, C, D. In response, CDS B delivers an updated mirror list of B, C, D to Client 1 for use for the remainder of the update transaction. In addition, CDS B delivers an updated source list of D, C, B (wherein CDS D is the primary CDS) for use by Client 1 to obtain a mirror list during future update transactions.

Figure 7:
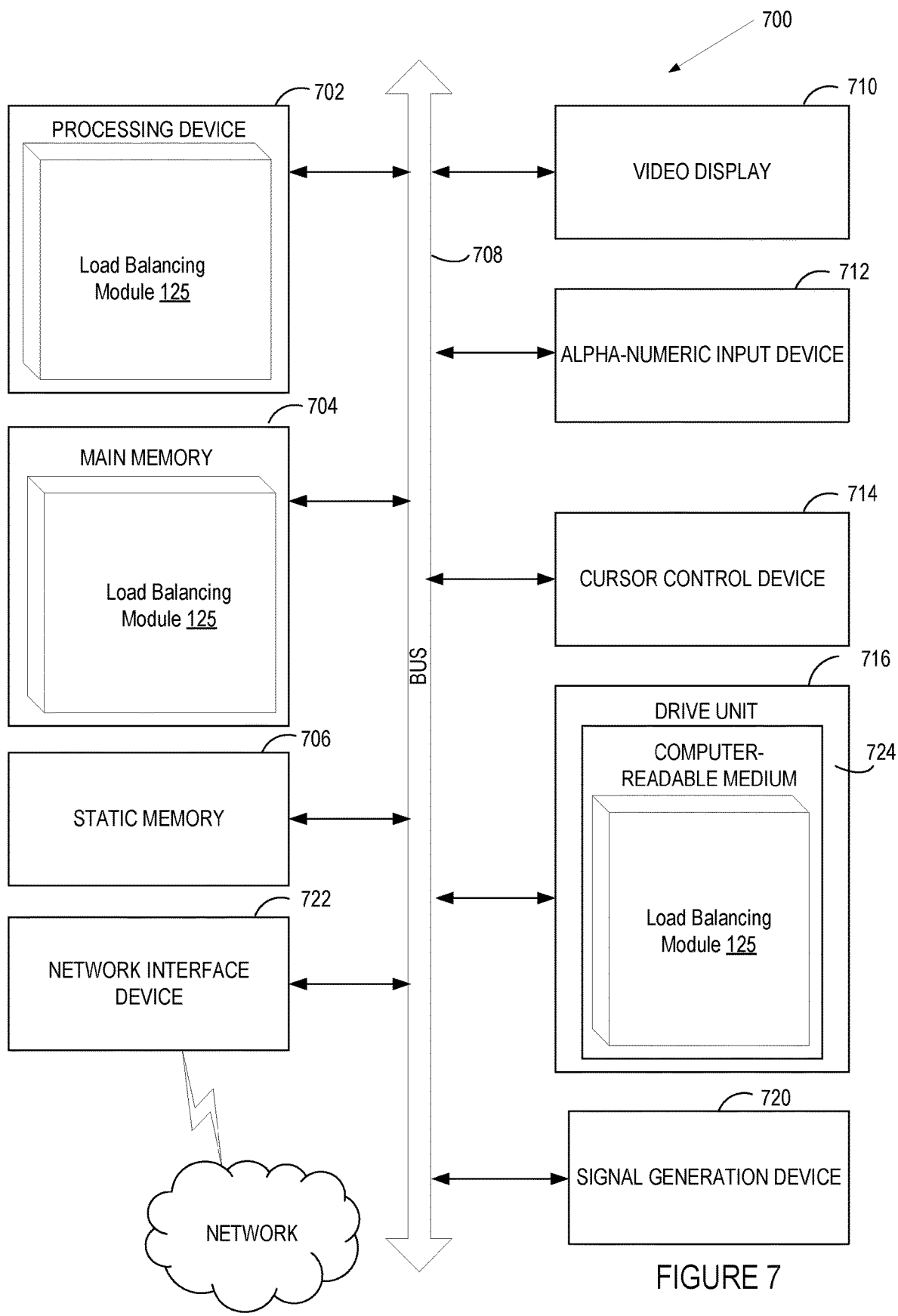
FIG. 7 illustrates an exemplary load balancing update management system.

FIG. 7 illustrates an exemplary content delivery system 700 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary content delivery system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The load balancing module (e.g., load balancing module 125A-N) in FIG. 1 may comprise processing device 702 configured to perform the operations and steps discussed herein.

The content delivery system 700 may further include a network interface device 722. The content delivery system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions of the load balancing module 125) embodying any one or more of the methodologies or functions described herein. The instructions of the load balancing module 125 may also reside, completely or at least partially, within the main memory 704 and/or within the processing device 702 during execution thereof by the content delivery system 700, the main memory 704 and the processing device 702 also constituting computer-readable media. The instructions of the load balancing module 125 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "grouping", "maintaining", "sending", "receiving", "delivering", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   maintaining, by a client system configured to store a source list, the source list comprising an ordered sequence of a plurality of content delivery servers, wherein the ordered sequence indicates a sequence of the plurality of content delivery servers for the client system to send a request to obtain a mirror list, wherein each of the plurality of content delivery servers maintains a cluster membership list identifying the plurality of content delivery servers in a cluster, wherein the source list is configured in view of the cluster membership list;
   determining, by a processing device of the client system, that a first content delivery server in the ordered sequence of the source list is unavailable;
   sending a mirror list request to a next content delivery server listed on the source list; and
   receiving, from the next content delivery server in the source list, an updated mirror list comprising an updated load balanced ordered sequence of the plurality of content delivery servers in view of an availability associated with remaining content delivery servers of the plurality of content delivery servers for the client system to contact to obtain an update package comprising information relating to a computing resource used by the client system.

2. The method of claim 1, wherein an initial entry on the updated load balanced ordered sequence comprises a second content delivery server.

3. The method of claim 2, further comprising:
   sending a request to the second content delivery server; and
   receiving, from the second content delivery server, the update package.

4. The method of claim 1, further comprising receiving an updated source list comprising an updated ordered sequence of the plurality of content delivery servers, wherein the updated ordered sequence indicates an updated sequence of the plurality of content delivery servers for the client system to send the request to obtain the mirror list.

5. The method of claim 1, wherein the updated mirror list comprising the updated load balanced ordered sequence of the plurality of content delivery servers received by the client system is generated in view of a round-robin rotation applied to the mirror list.

6. A system comprising:
   a memory; and
   a processing device, coupled to the memory, the processing device to:
   maintain, by the system configured to store a source list, the source list comprising an ordered sequence of a plurality of content delivery servers, wherein the ordered sequence indicates a sequence of the plurality of content delivery servers for a client system to send a request to obtain a mirror list, wherein each of the plurality of content delivery servers maintains a cluster membership list identifying the plurality of content delivery servers in a cluster, wherein the source list is configured in view of the cluster membership list;
   determine that a first content delivery server in the ordered sequence of the source list is unavailable;
   send a mirror list request to a next content delivery server listed on the source list; and
   receive, from the next content delivery server in the source list, an updated mirror list comprising an updated load balanced ordered sequence of the plurality of content delivery servers in view of an availability associated with remaining content delivery servers of the plurality of content delivery servers for the client system to contact to obtain an update package comprising information relating to a computing resource used by the client system.

7. The system of claim 6, wherein an initial entry on the updated load balanced ordered sequence comprises a second content delivery server.

8. The system of claim 7, the processing device further to:
send a request to the second content delivery server; and
receive, from the second content delivery server, the update package.

9. The system of claim 6, the processing device further to receive an updated source list comprising an updated ordered sequence of the plurality of content delivery servers, wherein the updated ordered sequence indicates an updated sequence of the plurality of content delivery servers for the client system to send the request to obtain the mirror list.

10. The system of claim 6, wherein the updated mirror list comprising the updated load balanced ordered sequence of the plurality of content delivery servers received by the system is generated in view of a round-robin rotation applied to the mirror list.

11. A non-transitory machine-readable storage medium storing instructions that cause a processing device to:
maintain, by a client system configured to store a source list, the a source list comprising an ordered sequence of a plurality of content delivery servers, wherein the ordered sequence indicates a sequence of the plurality of content delivery servers for the client system to send a request to obtain a mirror list, wherein each of the plurality of content delivery servers maintains a cluster membership list identifying the plurality of content delivery servers in a cluster, wherein the source list is configured in view of the cluster membership list;
determine that a first content delivery server in the ordered sequence of the source list is unavailable;
send a mirror list request to a next content delivery server listed on the source list; and
receive, from the next content delivery server in the source list, an updated mirror list comprising an updated load balanced ordered sequence of the plurality of content delivery servers in view of an availability associated with remaining content delivery servers of the plurality of content delivery servers for the client system to contact to obtain an update package comprising information relating to a computing resource used by the client system.

12. The non-transitory machine-readable storage medium of claim 11, wherein an initial entry on the updated load balanced ordered sequence comprises a second content delivery server.

13. The non-transitory machine-readable storage medium of claim 12, the processing device further to:
send a request to the second content delivery server; and
receive, from the second content delivery server, the update package.

14. The non-transitory machine-readable storage medium of claim 11, the processing device further to receive an updated source list comprising an updated ordered sequence of the plurality of content delivery servers, wherein the updated ordered sequence indicates an updated sequence of the plurality of content delivery servers for the client system to send the request to obtain the mirror list.

* * * * *